US007080960B2

(12) United States Patent  
Burnett

(10) Patent No.: US 7,080,960 B2
(45) Date of Patent: Jul. 25, 2006

(54) APPARATUS AND METHOD FOR TRANSPORTING WASTE MATERIALS

(75) Inventor: George Alexander Burnett, Aberdeen (GB)

(73) Assignee: Varco I/P, Inc., Houston, TX (US)

( * ) Notice: Subject to any disclaimer, the term of this patent is extended or adjusted under 35 U.S.C. 154(b) by 47 days.

(21) Appl. No.: 10/488,667

(22) PCT Filed: Sep. 4, 2002

(86) PCT No.: PCT/GB02/04044

§ 371 (c)(1),
(2), (4) Date: Mar. 4, 2004

(87) PCT Pub. No.: WO03/021074

PCT Pub. Date: Mar. 13, 2003

(65) Prior Publication Data

US 2005/0074302 A1 Apr. 7, 2005

(30) Foreign Application Priority Data

Sep. 4, 2001 (GB) ................................. 0121353.7

(51) Int. Cl.
*B65G 51/16* (2006.01)
(52) U.S. Cl. .............................. 406/11; 406/33; 406/14; 406/47; 406/151; 406/156
(58) Field of Classification Search .................. 406/11, 406/28, 33, 14, 47, 48, 151, 156
See application file for complete search history.

(56) References Cited

U.S. PATENT DOCUMENTS

| | | | |
|---|---|---|---|
| 1,559,666 A | 11/1925 | Bernier | |
| 2,576,283 A | 11/1951 | Chaney | |
| 2,816,803 A | 12/1957 | Clark et al. | |
| 2,979,235 A | 4/1961 | Greaves | |
| 3,071,297 A | 1/1963 | Lee | |
| 3,077,365 A * | 2/1963 | Fisher | 406/23 |
| 3,221,825 A | 12/1965 | Henderson | |
| 3,420,419 A | 1/1969 | Haslett, Jr. | |
| 3,708,207 A | 1/1973 | Steele | 302/24 |
| 3,762,773 A | 10/1973 | Schroeder | 302/53 |
| 3,923,343 A * | 12/1975 | Bird | 406/14 |
| 3,927,757 A | 12/1975 | Fauth | 198/37 |
| 4,059,195 A | 11/1977 | MacDonald et al. | 214/44 R |
| 4,073,244 A | 2/1978 | Snowdon | 110/165 R |
| 4,085,975 A | 4/1978 | Bilkvist | 302/23 |
| 4,098,412 A | 7/1978 | Shakshober | 214/15 D |
| 4,137,935 A | 2/1979 | Snowdon | 137/242 |
| 4,165,133 A | 8/1979 | Johnson | 406/109 |
| 4,181,494 A | 1/1980 | Kimberley | 432/2 |
| 4,200,412 A | 4/1980 | Steele | 406/22 |

(Continued)

*Primary Examiner*—Joe Dillon, Jr.
(74) *Attorney, Agent, or Firm*—Guy McClung

(57) ABSTRACT

An apparatus for transporting solid waste drill cuttings material produced in the drilling of an oil or gas well, the apparatus including: a waste supply apparatus; a feeder to transport the material; a pneumatic conveying apparatus to which the material is transferred from the feeder; at least one blockage sensing device in the conveyor; and a control apparatus for controlling feed rate of the feeder.

25 Claims, 2 Drawing Sheets

U.S. PATENT DOCUMENTS

| | | | |
|---|---|---|---|
| 4,318,643 A * | 3/1982 | Larsson et al. | 406/14 |
| 4,355,929 A | 10/1982 | Snowdon | 406/125 |
| 4,430,030 A | 2/1984 | Langen et al. | 406/146 |
| 4,515,503 A | 5/1985 | Snowdon | 406/11 |
| 4,525,106 A | 6/1985 | DiBuo et al. | 406/60 |
| 4,525,107 A | 6/1985 | Feldsted | 406/25 |
| 4,546,783 A | 10/1985 | Lott | 134/109 |
| 4,595,422 A | 6/1986 | Hill et al. | 134/19 |
| 4,606,283 A | 8/1986 | Des Ormeaux et al. | 110/250 |
| 4,662,799 A | 5/1987 | Paul et al. | 406/14 |
| 4,715,748 A * | 12/1987 | Krambrock | 406/11 |
| 4,726,301 A | 2/1988 | Des Ormeaux et al. | 110/250 |
| 4,822,542 A | 4/1989 | Kuwabara et al. | 264/50 |
| 4,834,587 A | 5/1989 | Crawley et al. | 406/23 |
| 4,861,200 A | 8/1989 | Lubbehusen et al. | 406/14 |
| 4,881,473 A | 11/1989 | Skinner | 110/244 |
| 4,909,676 A * | 3/1990 | Heep et al. | 406/14 |
| 4,940,131 A * | 7/1990 | Swartz | 198/524 |
| 4,941,779 A | 7/1990 | Dewitz et al. | 406/138 |
| 5,071,289 A * | 12/1991 | Spivak | 406/11 |
| 5,071,290 A | 12/1991 | Johnson | 406/171 |
| 5,090,498 A | 2/1992 | Hamill | 175/206 |
| 5,122,038 A | 6/1992 | Malkoski | 417/313 |
| 5,129,468 A | 7/1992 | Parmenter | 175/66 |
| 5,248,222 A | 9/1993 | Littman et al. | 406/142 |
| 5,265,730 A * | 11/1993 | Norris et al. | 209/326 |
| 5,269,635 A * | 12/1993 | Taylor, Jr. | 406/10 |
| 5,303,998 A | 4/1994 | Whitlatch et al. | 356/3 |
| 5,402,857 A | 4/1995 | Dietzen | 175/66 |
| 5,433,559 A | 7/1995 | VandeSande | 406/145 |
| 5,439,489 A | 8/1995 | Scalliet et al. | 44/281 |
| 5,454,957 A | 10/1995 | Roff | 210/768 |
| 5,570,749 A | 11/1996 | Reed | 175/66 |
| 5,624,058 A | 4/1997 | Bailey | 222/240 |
| 5,634,713 A * | 6/1997 | Abe | 366/102 |
| 5,660,506 A * | 8/1997 | Berge et al. | 406/3 |
| 5,842,529 A | 12/1998 | Dietzen | 175/66 |
| 5,853,583 A | 12/1998 | Shah | 210/340 |
| 5,855,456 A * | 1/1999 | Mueller | 406/11 |
| 5,884,715 A | 3/1999 | Reddoch | 176/66 |
| 5,913,372 A | 6/1999 | Dietzen | 175/66 |
| 5,996,484 A | 12/1999 | Reddoch | 100/37 |
| 6,055,781 A | 5/2000 | Johanson | 52/197 |
| 6,106,733 A | 8/2000 | Wood | 210/774 |
| 6,138,834 A | 10/2000 | Southale | 209/17 |
| 6,170,580 B1 | 1/2001 | Reddoch | 175/66 |
| 6,179,070 B1 | 1/2001 | Dietzen | 175/66 |
| 6,279,471 B1 | 8/2001 | Reddoch | 100/37 |
| 6,315,813 B1 | 11/2001 | Morgan et al. | 95/23 |
| 6,346,197 B1 | 2/2002 | Stephenson et al. | 210/704 |
| 6,386,800 B1 * | 5/2002 | van Eyck | 406/95 |
| 6,461,505 B1 | 10/2002 | Danielsson et al. | 210/248 |
| 6,468,426 B1 | 10/2002 | Klass | 210/304 |
| 6,491,167 B1 | 12/2002 | Mahrenholtz et al. | 209/722 |
| 6,506,311 B1 | 1/2003 | DeGarmo et al. | 210/788 |
| 6,533,946 B1 | 3/2003 | Pullman | 210/787 |
| 6,561,691 B1 * | 5/2003 | McCann et al. | 366/299 |
| 6,582,600 B1 | 6/2003 | Hashmi et al. | 210/340 |
| 6,585,115 B1 | 7/2003 | Reddoch et al. | 209/3 |
| 6,596,169 B1 | 7/2003 | Rong et al. | 210/512.1 |
| 6,602,181 B1 | 8/2003 | Quintero et al. | 588/250 |
| 6,698,989 B1 | 3/2004 | Snowdon | 414/137 |
| 6,702,539 B1 | 3/2004 | Snowdon | 414/137.1 |
| 6,709,216 B1 | 3/2004 | Snowdon | 414/137 |
| 6,709,217 B1 | 3/2004 | Snowdon | 414/137.1 |
| 6,786,681 B1 * | 9/2004 | Grasshoff | 406/11 |
| 6,827,529 B1 * | 12/2004 | Berge et al. | 406/28 |
| 6,890,129 B1 * | 5/2005 | Fabbri | 406/106 |
| 2004/0086345 A1 | 5/2004 | Snowdon | 406/198 |
| 2004/0086360 A1 | 5/2004 | Snowdon | 414/137.1 |
| 2004/0096298 A1 | 5/2004 | Snowdon | 414/137.1 |

* cited by examiner

APPARATUS AND METHOD FOR TRANSPORTING WASTE MATERIALS

BACKGROUND OF THE INVENTION

1. Field of the Invention

The present invention relates to an apparatus and method for transporting solid waste materials. The apparatus and method are particularly, but not exclusively, for transporting drill cuttings and other waste resulting from the drilling of a borehole or a tunnel.

2. Description of Related Art

A drill bit arranged on the end of a drill pipe string is used to drill a borehole or tunnel in the formation of an oil or gas well or the like. A drilling fluid known as ôdrilling mudö is pumped through the drill string to the drill bit to lubricate the drill bit. The drilling mud is also used to carry the cuttings produced by the drill bit to the surface through the annulus formed between the drill string and the borehole or tunnel. The drilling mud contains expensive synthetic oil-based lubricants and it is normal therefore to recover the used drilling mud, but this requires the cuttings to be removed from the drilling mud. Typically this is achieved by processing the drilling fluid with a vibratory screening machine (e.g. of the type disclosed in U.S. Pat. No. 5,265,730 or WO 98/16328), which separates the cuttings from the drilling fluid.

In the past, on oil platforms out at sea, such cuttings were simply thrown overboard but this practice has been discontinued, as being environmentally damaging. It is known to pass the recovered cuttings into a ôditchö (i.e. a duct or channel), from which the cuttings are removed by the application of suction from a vacuum hose, the cuttings being transported along the vacuum hose and deposited in a collection hopper. Such a method is labour intensive, typically requiring three people to perform the operation: one person to guide the hose along the ditch, one to monitor the collection hopper, and a third person to clear any blockages in the hose.

BRIEF SUMMARY OF THE INVENTION

In a first aspect the invention provides an apparatus for transporting solid waste materials, the apparatus comprising: an upstream waste supply means; feed means to transport waste from the waste supply means to a pneumatic conveyancing means; which pneumatic conveyancing means comprises a tube within which waste material is transferred from the feed means to a downstream waste collector; wherein said tube is associated with at least one blockage sensing device, and electronic data processing means to process data output from the blockage sensing device.

In a second aspect the invention provides an apparatus for transporting solid waste materials, the apparatus comprising: an upstream waste supply means; variable rate feed means to transport waste from the waste supply means to a pneumatic conveyancing means; which pneumatic conveyancing means comprises a tube within which waste is transferred from the feed means to a downstream waste collector, wherein the downstream waste collector comprises a level sensing device to sense the amount of waste accumulated in the collector; and electronic data processing means to process data output from the level sensing means.

The level sensing device may be entirely conventional of the type known to those skilled in the art (e.g. an optical-type sensor, an electrical conductivity/resistivity-type sensor or the like). The level sensing device may provide a continuous ôquantitativeö read-out, or may simply provide a ôqualitativeö read-out (e.g. being triggered to provide a signal when the amount of waste in the collector reaches a predetermined level).

The tube of the pneumatic conveyancing means may comprise a flexible hose or if conditions allow, a solid walled pipe.

The apparatus is preferably suited to handle waste material comprising cuttings produced in the formation of a borehole. Most preferably, in the formation of an oil or gas well.

Advantageously, the feed means is a variable rate feed means and preferably the apparatus further comprises control means to control the rate of the variable rate feed means. In certain circumstances, this will be responsive to the output of the blockage sensing device.

Preferably, the apparatus further comprises an upstream hopper arranged between the upstream waste supply means and the pneumatic conveyancying means. In this way, the waste supply means, which generally comprises a screw thread conveyor, can be maintained at a constant speed, or one which is solely dependent on the quantity of waste being discharged from the shale shakers. It is preferable to have a conveyor arranged beneath said hopper for feeding said pneumatic conveyancing means, which is preferably of the screw thread type and advantageously, controllable so as to be able to adjust the rate at which waste is fed into the pneumatic conveyancing means and most preferably controlled by a variable frequency drive means so that the speed of rotation of a screw-threaded conveyor.

The rate at which solid waste is generated depends upon the speed of penetration of the drill bit. This can be highly variable and may often fluctuate considerably depending on the resistance of the material being drilled, such that if the drill bit encounters (for example) a weaker rock stratum the rate of drill penetration will significantly increase and there will be a sudden surge of drill cuttings produced. The use of an upstream waste supply means in the form of a hopper or similar relatively large volume device prevents an equivalent surge in the rate of cuttings progressing downstream in the apparatus of the invention.

Advantageously, the apparatus further comprises at least two downstream waste collectors, each downstream waste collector being provided with a level sensing device. In this way, the apparatus may be operated continuously if desired: a first waste collector is used to collect the waste initially. When the level sensing device detects that the collector is nearly full a valve can be closed, cutting off the supply of waste to the first collector and (typically) another valve opened so as to direct the waste to a second waste collector. The first waste collector may then be emptied whilst the second collector is in use, and vice versa.

The pneumatic conveyancing means preferably comprises means to provide a positive pressure, such that, in use, the positive pressure pushes the waste through said tube. Although it is most advantageous to provide a negative pressure, such that, in use, the negative pressure pulls the waste through said tube. The means may comprises an impeller, preferably a Roots type fan.

The preferred range of negative pressure is between −14 to −24 inches of mercury (Hg) (−47.4 kPa to 81.3 kPa). A negative pressure of this magnitude is capable of causing air to move within the pneumatic pipe or hose at a velocity of at least 40 meters/sec, which the inventor considers to be the minimum velocity desirable to transport waste of the type typically found in drill cuttings.

The pneumatic pipe or hose will typically be of the order of 50–100 m in length and most typically about 50–75 m. A suitable pneumatic pipe will typically be formed from stainless steel, whereas a suitable flexible hose will normally be formed from a synthetic plastics material.

Preferably, the apparatus comprises an electronic control means, such as a programmable control means comprises a programmable logic controller (PLC) or personal computer (PC).

The electronic control means preferably controls the rate of the feed means feeding waste to the pneumatic conveyancing means, responsive to data received from the level sensing device and/or the blockage sensing device.

For example, where the feed means comprises a screw thread conveyor, the speed of rotation thereof may conveniently be determined by the control means, acting through (for example) a variable frequency drive (VFD) means, or an inverter.

Advantageously, the blockage sensor will conveniently take the form of a pressure sensor to determine the pressure within the tube. Preferably, the tube will comprises a plurality of blockage sensors, positioned at intervals (regular or otherwise) along said tube.

If a blockage occurs, this causes a decrease in pressure (i.e. greater vacuum) between the blockage and the fan or other suction-generating means.

Data from the blockage sensing devices will indicate to the control means the approximate location of the blockage, and its severity. The control means may then instigate one or more changes to the operation of the apparatus in order to clear the blockage.

Preferably, the electronic control means reduces the rate of feed of waste into the pneumatic conveyancing means, by slowing or even stopping entirely the variable rate feed means when a blockage is sensed by said blockage sensor.

Advantageously, an inlet valve is provided to allow a flow of flushing liquid through said tube of said pneumatic conveyancing means, typically the flushing liquid is water or oil. Preferably, control means may be provided in the form of computer control for monitoring flushing of the pneumatic supply means.

Preferably, at least one relief valve in said tube of said pneumatic conveyancing means.

Relief valves may be may be positioned at a plurality of locations along the length of the tube (especially just downstream of locations in a fixed pipe where turbulent air flow may cause deposition of solid waste—such as after a series of bends or other irregularities). The relief valve(s) nearest to the blockage may be opened in response to a command from the control means and/or may open automatically should the pressure at the site of the valve fall below a predetermined value. Opening of the relief valve will allow a sudden ingress of air into the pipe near the blockage which may facilitate its clearance.

Whilst a greater vacuum will increase the velocity of air within the pneumatic conveyancing means, the reduced air density will reduce the efficiency of transport of the solid waste. Accordingly, it is generally desirable that the negative pressure within the pneumatic conveyancing means should not become lower than 18 inches of mercury (Hg) (61 kPa). Accordingly it is desirable that the density of waste in the apparatus should not exceed a level which requires a greater vacuum than −18 inches Hg (61 kPa). And the feed rate should therefore be slow enough to comply with this parameter. Equally however, the feed rate must be high enough to prevent the upstream waste collector from over-filling. Accordingly it is generally preferred to provide a level sensing device for the upstream collector so that, if the collector starts to get too full, the feed rate from the collector to the pneumatic conveyancing means can be increased.

The upstream waste supply means may comprise shale shakers.

Preferably, the first aspect of the invention further comprises a level sensing device to sense the amount of waste accumulated in the downstream waste collector; and electronic data processing means to process data output from the level sensing means.

DETAILED DESCRIPTION OF THE INVENTION

The first aspect of the invention also provides a method for transporting solid waste, comprising the steps of supplying solid waste material from an upstream waste supply means; transporting waste from the waste supply means using feed means to a pneumatic conveyancing means; which pneumatic conveyancing means comprises a tube within which waste material is transferred from the feed means to a downstream waste collector; wherein said tube is associated with at least one blockage sensing device, and electronic data processing means to process data output from the blockage sensing device, the method further comprising the step of sensing a blockage with said at least one blockage sensing device.

The second aspect of the invention also provides a method for transporting solid waste, comprising the steps of supplying solid waste material from an upstream waste supply means; transporting waste from the waste supply means using feed means to a pneumatic conveyancing means; which pneumatic conveyancing means comprises a tube within which waste is transferred from the feed means to a downstream waste collector, wherein the downstream waste collector comprises a level sensing device, and electronic data processing means the method further comprising the steps of sensing the amount of waste accumulated in the downstream waste collector with the level sensing device (24A, 24B); and processing data output from the level sensing means (24A, 24B) with the electronic data processing means.

Figure 1A:
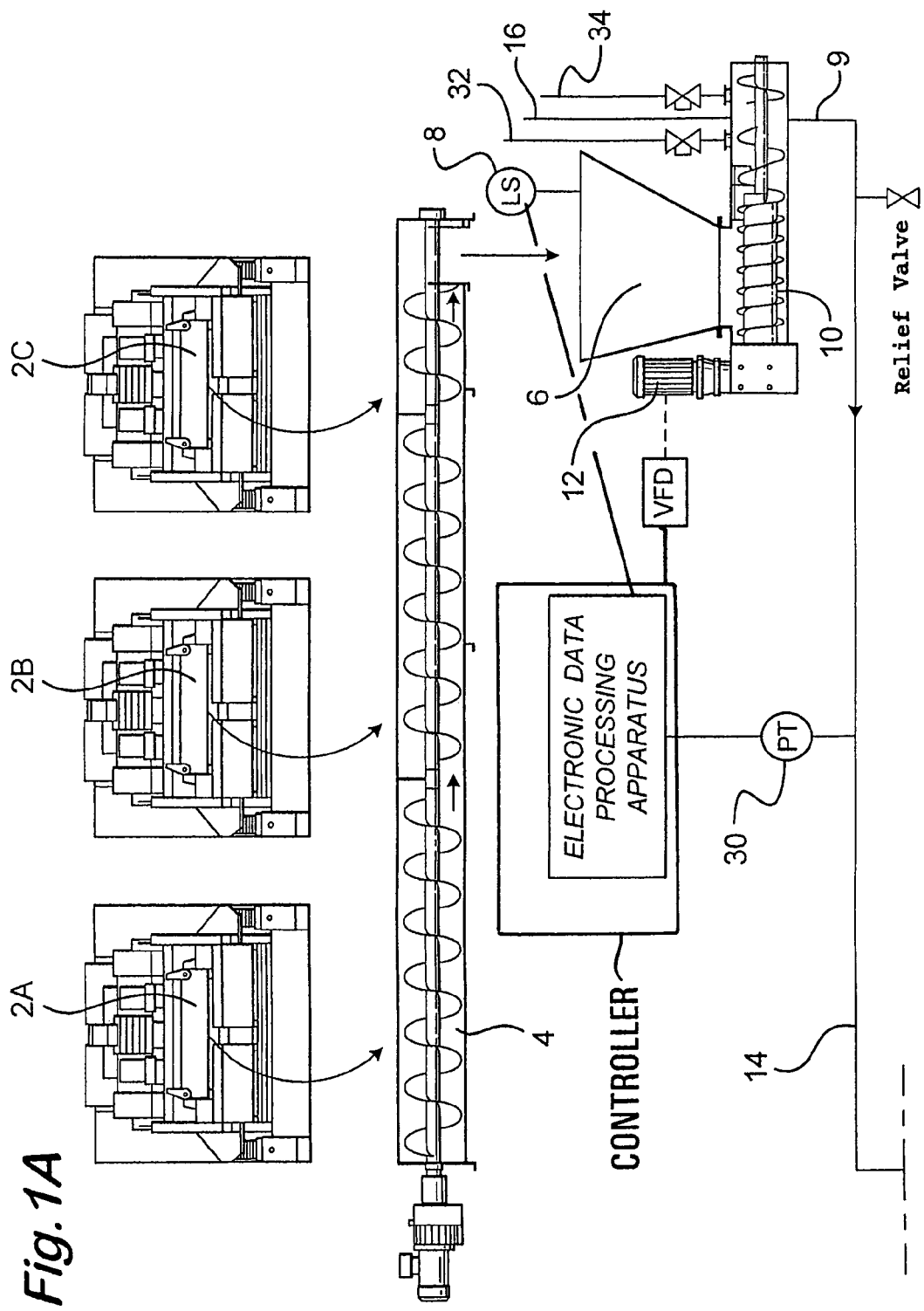
FIG. 1A is a schematic view of a system according to the present invention.
Figure 1B:
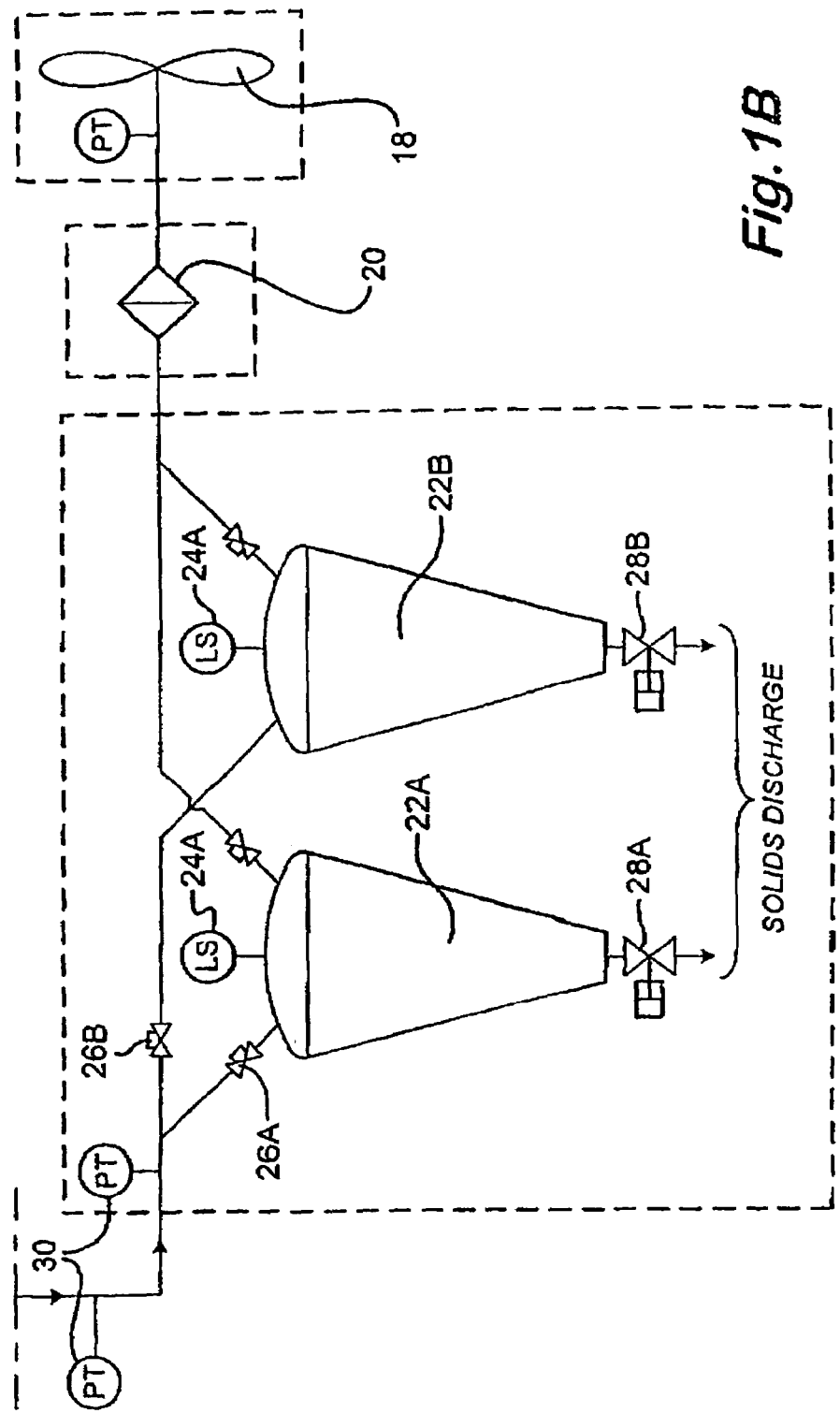
FIG. 1B is a schematic view of a system according to the present invention.

The invention will now be described by way of example with reference to the accompanying drawings in which FIGS. 1A and 1B, is a schematic representation of an apparatus in accordance with the invention.

FIGS. 1A and 1B show an apparatus in accordance with the invention which is suitable for processing of waste solids such as drill cuttings which might be produced at an oil well.

Vibratory screening machines 2A, 2B and 2C separate solid cuttings from drilling fluid, and the cuttings are passed to a conventional screw threaded cuttings conveyor 4. The screw threaded cuttings conveyor 4 is known as a "ditch". The conveyor 4 conveys the cuttings to an upstream hopper 6. The upstream hopper 6 is provided with a level sensing device ("LS") 8. Data from the level sensing device is input to electronic data processing means comprised within a programmable logic controller (PLC) (not shown), which PLC is a control means which controls the operation of the apparatus.

Waste solids are taken from the upstream hopper 6 to a pneumatic conveyancing means 9 by a variable rate feed means 10, which comprises a "cuttings feed conveyor" driven by a variable frequency drive means 12.

The pneumatic conveyancing means 9 comprises: a pneumatic line (in the form of a pipe or hose) 14, an air inlet 16, a Roots type blower 18, an air filter 20, and an air outlet (not shown).

The pneumatic conveyancing means 9 transports the waste by suction, in the direction shown by the arrows, along the pneumatic line to one of two downstream waste collectors 22A and 22B ("Discharge Hopper No. 1" and "Discharge Hopper No. 2" respectively). Each waste collector 22A and 22B is provided with its own level sensing device 24A and 24B. The pneumatic line 14 comprises a respective hopper feed valve 26A and 26B for each collector 22A and 22B. Thus, when collector 22A is full, feed valve 26A closes and feed vale 26B opens, diverting further waste to collector 22B. Collector 22A can be emptied (by waste outlet 28A) whilst collector 22B is in use, and likewise collector 22B can be discharged via outlet 28B whilst collector 22A is in use.

The pneumatic line 14 is provided with a plurality of blockage sensing devices (pressure transducers "PT") 30. These detect blockages in the pneumatic line 14 by a strengthening of the partial vacuum downstream of a blockage. Data from the blockage sensing device 30 is input into the data processing means of the PLC, which can command: (i) alteration of the speed of the variable frequency drive means 12; and/or (ii) flushing of the pneumatic line 14 with water or oil from a respective water or oil inlet 32/34; and/or (iii) opening of one or more relief valves (not shown) located along the pneumatic line 14. If these procedures fail to clear the blockage the control means can generate a visible and/or audible alarm signal (e.g. in response to the pressure falling below a certain threshold for a defined period of time; and/or falling below a minimum desirable operating threshold). In addition the control means can cause an increase in the feed rate into the pneumatic conveyancing means if the level sensing device 8 associated with upstream waste collector indicates that the hopper 6 is becoming too full.

The invention claimed is:

1. An apparatus for transporting solid waste drill cuttings material produced in the drilling of an oil or gas well, said solid waste drill cuttings material in a stream produced by separation of said material from a mixture of said material with drilling fluid, the apparatus comprising
   a waste supply apparatus,
   a variable rate screw feeder to transport said solid waste drill cuttings material from the waste supply apparatus to a pneumatic conveying apparatus, said screw feeder having variable positive rotation,
   said pneumatic conveying apparatus having a tube within which said solid waste drill cuttings material is transferred from the feeder to a downstream waste collector,
   at least one blockage sensing device in said tube,
   control apparatus for controlling feed rate of the feeder, the control apparatus including electronic data processing apparatus to process data output from the blockage sensing device for controlling the rate of the feeder feeding said solid waste drill cuttings material to the pneumatic conveying apparatus.

2. The apparatus of claim 1 wherein said tube of said pneumatic conveying apparatus comprises a flexible hose.

3. The apparatus of claim 1 wherein said tube of said pneumatic conveying apparatus comprises a solid walled pipe.

4. The apparatus of claim 1 further comprising
   an upstream hopper arranged between the waste supply apparatus and the pneumatic conveying apparatus.

5. The apparatus of claim 4 further comprising
   a conveyor beneath said upstream hopper for feeding said pneumatic conveying apparatus.

6. The apparatus of claim 5 wherein said conveyor is of the screw thread type.

7. The apparatus of claim 6 wherein the conveyor is controllable so as to be able to adjust the rate at which material is fed into the pneumatic conveying apparatus.

8. The apparatus of claim 6 wherein the conveyor has a variable frequency drive apparatus so that the speed of rotation of the conveyor can be controlled.

9. The apparatus of claim 1 wherein the waste supply apparatus includes a conveyor.

10. The apparatus of claim 9 wherein said conveyor comprises a screw thread conveyor.

11. The apparatus of claim 1 further comprising
    said downstream waste collector provided with a level sensing device.

12. The apparatus of claim 1 wherein said pneumatic conveying apparatus comprises a device to provide a positive pressure, such that, in use, the positive pressure pushes material through said tube.

13. The apparatus of claim 1 wherein said pneumatic conveying apparatus comprises a device to provide a negative pressure, such that, in use, the negative pressure pulls material through said tube.

14. The apparatus of claim 13 wherein the negative pressure is between −14 to −24 inches of mercury (Hg) (−47.4 kPa to 81.3 kPa).

15. The apparatus of claim 1 wherein the pneumatic conveying apparatus comprises an impeller.

16. The apparatus of claim 12 wherein said pneumatic conveying apparatus is of a Roots type fan.

17. The apparatus of claim 1 wherein said at least one blockage sensing device is a pressure sensor for determining pressure within the tube.

18. The apparatus as of claim 1 wherein said at least one blockage sensing device is a plurality of blockage sensors, positioned at intervals along said tube.

19. The apparatus of claim 1 wherein the control apparatus can reduce rate of feed of material into the pneumatic conveying apparatus, by slowing or stopping entirely the feeder when a blockage is sensed.

20. The apparatus of claim 1 further comprising
    an inlet valve to allow a flow of flushing liquid through said tube of said pneumatic conveying apparatus.

21. The apparatus of claim 1 further comprising
    a flushing system for flushing of the apparatus.

22. The apparatus of claim 1 further comprising
    at least one relief valve in said tube of said pneumatic conveying apparatus.

23. The apparatus of claim 1 wherein said waste supply apparatus comprises shale shakers.

24. The apparatus of claim 1 further comprising
    said downstream waste collector having a level sensing device to sense the amount of waste accumulated in the downstream waste collector, and
    electronic data processing apparatus to process data output from the level sensing device.

25. A method for transporting solid waste drill cuttings material produced by shale shakers in the drilling of an oil or gas well, the method comprising supplying solid waste drill cuttings material to an upstream waste supply apparatus, using a variable rate screw feeder to transport said material from the upstream waste supply apparatus to a pneumatic conveying apparatus, said screw feeder having variable positive rotation, said pneumatic conveying apparatus comprising a tube within which material is transferred from the feeder to a downstream waste collector; wherein said tube has at least one blockage sensing device, and a control apparatus comprising electronic data processing apparatus to process data output from the blockage sensing device, sensing a blockage with said at least one blockage sensing device, using said electronic data processing apparatus to process data output from the blockage sensing device, using said control apparatus to control the rate of the feeder feeding material to the pneumatic conveying apparatus based on data from the blockage sensing device.

* * * * *